(12) United States Patent
Oguchi et al.

(10) Patent No.: US 8,986,505 B2
(45) Date of Patent: Mar. 24, 2015

(54) SHEET MANUFACTURING APPARATUS (71) Applicant: Seiko Epson Corporation, Tokyo (JP)

(72) Inventors: Yuki Oguchi, Nagano (JP); Shunichi Seki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/223,085

(22) Filed: Mar. 24, 2014

(65) Prior Publication Data

US 2014/0290889 A1   Oct. 2, 2014

(30) Foreign Application Priority Data

Mar. 27, 2013   (JP) .................................. 2013-065810
Feb. 13, 2014   (JP) .................................. 2014-025125

(51) Int. Cl.
*D21F 1/06*   (2006.01)
*B07B 1/00*   (2006.01)

(52) U.S. Cl.
CPC ........................................ *B07B 1/00* (2013.01)
USPC ............ 162/259; 700/127; 700/128; 700/129

(58) Field of Classification Search
USPC ........................ 162/259, 4; 700/127, 128, 129
See application file for complete search history.

(56) References Cited

U.S. PATENT DOCUMENTS

2014/0027075 A1*   1/2014   Yamagami et al. ............... 162/4

FOREIGN PATENT DOCUMENTS

EP         2664708 A1       11/2013
JP         2012-144819 A    8/2012

* cited by examiner

*Primary Examiner* — Mark Halpern
(74) *Attorney, Agent, or Firm* — Global IP Counselors, LLP (57) ABSTRACT

A sheet manufacturing apparatus is provided with a screen portion in which introduced material is passed through a plurality of openings; an information acquiring unit configured to acquire at least one of inflow information related to a flow rate of the material that flows into the screen portion and outflow information related to a flow rate of the material that passes through the screen portion; and a controller configured to make a determination that a clogging of the screen portion is generated when the flow rate is reduced based on at least one of the inflow information and the outflow information.

10 Claims, 12 Drawing Sheets

SHEET MANUFACTURING APPARATUS

CROSS-REFERENCE TO RELATED APPLICATIONS

This application claims priority to Japanese Patent Application No. 2013-065810 filed on Mar. 27, 2013 and Japanese Patent Application No. 2014-025125 filed on Feb. 13, 2014. The entire disclosure of Japanese Patent Application Nos. 2013-065810 and 2014-025125 is hereby incorporated herein by reference.

BACKGROUND

1. Technical Field

The present invention related to a sheet manufacturing apparatus.

2. Related Art

In used paper discharged from offices, used paper describing confidential matters is included. Therefore, from the viewpoint of security protection, it is also desired that such used paper can be processed in their offices. In small offices, a wet-type sheet manufacturing apparatus, which uses a large amount of water, cannot be suitably used, and therefore a dry-type sheet manufacturing apparatus simplified in structure has been proposed (see, for example, Japanese Unexamined Laid-open Patent Application No. 2012-144819).

In the aforementioned sheet manufacturing apparatus, fibers pass through openings of a screen of a forming drum. In such forming drum corresponding to the screen portion, the fibers were caught while passing through the openings, and the openings were clogged so as to generate a clogging. However, there was a problem that even when the clogging was generated, it could not be determined. Further, there was a problem that the user cannot recognize the generation of clogging.

SUMMARY

The present invention was made to solve at least a part of the aforementioned objects, and is capable of actualizing as the following embodiments or applied examples.

A sheet manufacturing apparatus according to this applied example is provided with a screen portion having openings through which an introduced material passes, and when the flow rate was reduced, a generation of clogging in the screen portion is determined based on at least one of inflow information related to a flow rate of the material, which flows into the screen portion, and outflow information related to a flow rate of the material, which passes through the screen portion.

When the clogging was generated in the screen portion, it becomes a resistance for the material that flows into the screen portion or flows out from the screen portion. Therefore, the flow rate of the material is reduced. With this structure, by obtaining the information of flow rate for the inflow to the screen portion or the information of the flow rate for the outflow from the screen portion, the clogging of the screen portion can be determined.

In the sheet manufacturing apparatus according to the aforementioned applied example, the inflow information denotes the flow rate of air which flows into the screen portion.

The material is transferred by airflow that flows into the screen portion. When a clogging is generated in the screen portion, a flow rate of air that flows into the screen portion is reduced. Therefore, the flow rate of material and the flow rate of air are related so that the flow rate of air becomes the inflow information related to the flow rate of material. With this structure, by the flow rate of air that flows into the screen portion, a clogging of the screen portion can be determined.

In the sheet manufacturing apparatus according to the aforementioned applied example, the inflow information denotes the flow rate of the material that flows into the screen portion.

When a clogging was generated in the screen portion, the material that flows into the screen portion is reduced. With this structure, by the flow rate information of the material that flows into the screen portion, the clogging of the screen portion can be determined.

In the sheet manufacturing apparatus according to the aforementioned example, the outflow information denotes the flow rate of air that flows out from the screen portion.

When a clogging was generated in the screen portion, a flow rate of air that flows out from the screen portion is reduced. Therefore, the flow rate of material and the flow rate of air are related so that the flow rate of air becomes the inflow information related to the flow rate of material. With this structure, by the flow rate of air that flows out from the screen portion, a clogging of the screen portion can be determined.

In the sheet manufacturing apparatus according to the aforementioned example, the outflow information denotes a thickness of deposited material.

When a clogging was generated in the screen portion, the flow rate of the material that flows out from the screen portion is reduced. When the material flowing out from the screen portion is reduced, the thickness of the deposited material is also reduced. With this structure, by the information related to the thickness of the deposited material, the clogging of the screen portion can be determined.

In the sheet manufacturing apparatus according to the aforementioned example, the outflow information denotes a weight of the deposited material.

When the thickness of the deposited material is reduced, the weight of the material is also reduced. With this structure, by the information related to the weight of the deposited material, the clogging of the screen portion can be determined.

In the sheet manufacturing apparatus according to the aforementioned example, the outflow information denotes the flow rate of material flowing out from the screen portion.

With this structure, by the information related to the flow rate of material flowing out from the screen portion, a clogging of the screen portion can be determined.

The sheet manufacturing apparatus according to the aforementioned example is provided with a suction portion configured to suction the material that passes through the screen portion, and the outflow information denotes information related to a load for driving the suction portion.

When a clogging was generated in the screen portion, the drive load of the suction portion that suctions the material passing through the screen portion is increased. With this structure, by the information related to the load for driving the suction portion, the clogging of the screen portion can be determined.

In the sheet manufacturing apparatus according to the aforementioned example, when the determination that the clogging is generated in the screen portion is made, the flow rate of the material that flows into the screen portion is increased.

With this structure, the lowering of the flow rate of the material, which flows into the screen portion, caused by the generation of clogging can be suppressed.

In the sheet manufacturing apparatus according to the aforementioned example, when the determination that the clogging is generation in the screen portion is made, the flow rate of the material that flows into the screen portion is increased more than the flow rate of the material that flows into the screen portion before the generation of clogging.

With this structure, by increasing the flow rate of the material that flows into the screen portion than the flow rate of the material that flows into the screen portion before the generation of clogging, at least a part of clogging of the screen portion can be resolved.

BRIEF DESCRIPTION OF THE DRAWINGS

Referring now to the attached drawings which form a part of this original disclosure.

DETAILED DESCRIPTION OF EXEMPLARY EMBODIMENTS

Hereinafter, the first to fourth embodiments of the present invention will be explained with reference to the drawings. In each of the following drawings, the scale of each member, etc., is shown so as to be different from the actual scale to make each member, etc., recognizable size.

First Embodiment

Initially, a structure of a sheet manufacturing apparatus according to this embodiment will be explained. The sheet manufacturing apparatus is provided based on the technology that recycles a stock material (defibration object) such as, e.g., a used paper, a pulp sheet, etc. to a new sheet. A plurality of openings is provided, and a screen portion in which an introduced material passes through the openings is provided. When a flow rate was reduced, there is a function that a clogging of the screen portion is detected based on at least one of inflow information related to a flow rate of material that flows into the screen portion and outflow information related to a flow rate of material that passes through the screen portion. A stock material as a defibration object supplied to the sheet manufacturing apparatus according to the present embodiment is, for example, used paper (stock material PU) of A4 size, etc., which is a mainstream size in offices. Hereinafter, concrete explanation will be made.

Figure 1:
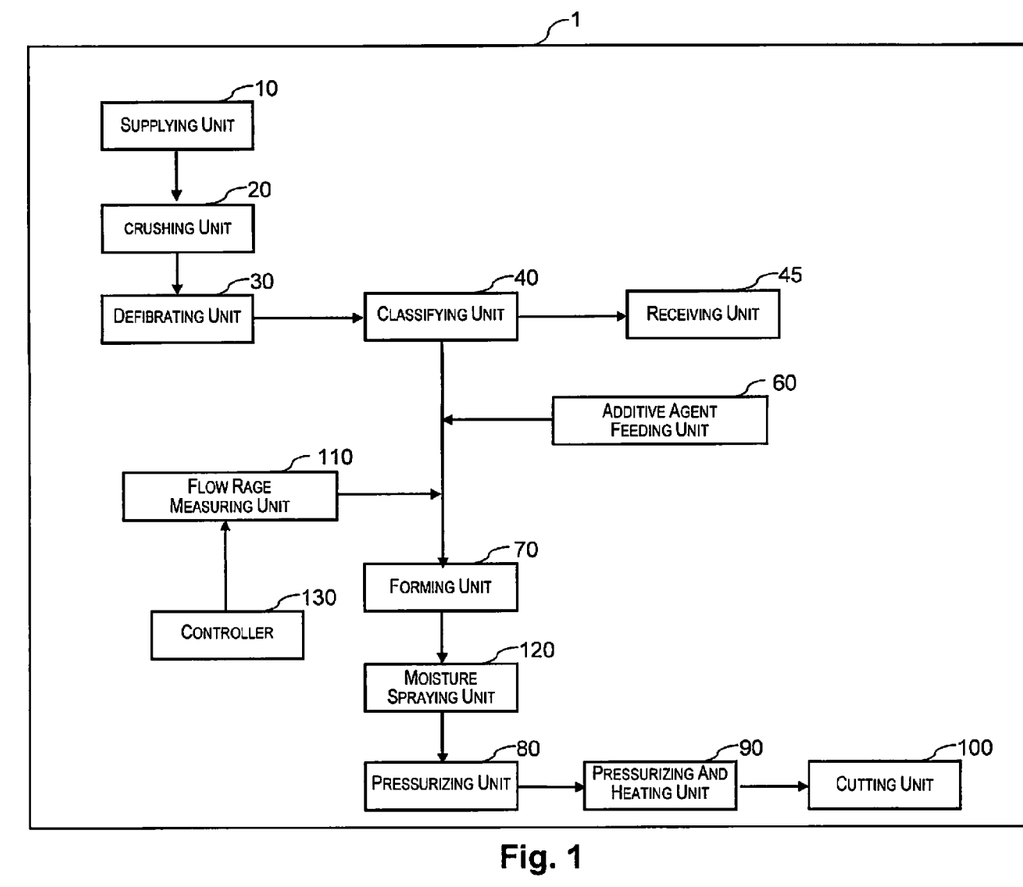
FIG. 1 is a schematic view showing a structure of a sheet manufacturing apparatus according to the first embodiment.

FIG. 1 is a schematic diagram showing a structure of the sheet manufacturing apparatus according to the present embodiment. As shown in FIG. 1, the sheet manufacturing apparatus 1 is provided with a supplying unit 10, a crushing unit 20, a defibrating unit 30, a classifying unit 40, a receiving unit 45, an additive agent feeding unit 60, a forming unit 70, a moisture spraying unit 120, a pressurizing unit 80, a pressurizing and heating unit 90, and a cutting unit 100. Further, a flow rate measuring unit 110 as an information acquiring unit that acquires the inflow information is provided. And, in the sheet manufacturing apparatus 1, a controller 130 that controls these units is provided.

Figure 2:
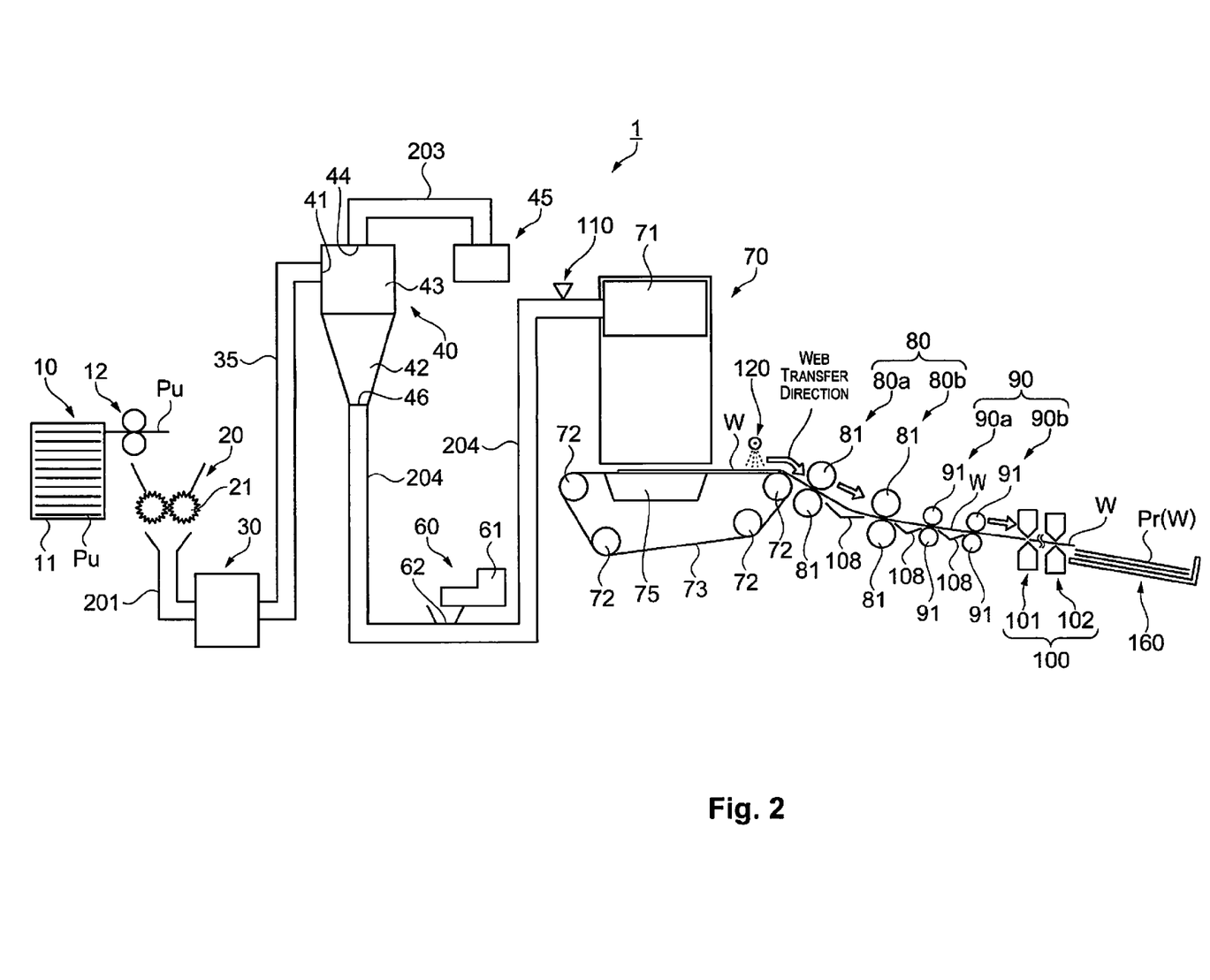
FIG. 2 is another schematic view showing the structure of the sheet manufacturing apparatus according to the first embodiment.

FIG. 2 is another schematic view showing a structure of a sheet manufacturing apparatus according to the present embodiment. As shown in FIG. 2, the supplying unit 10 supplies a stock material as a defibration object to crushing unit 20. The supplying unit 10 is provided with, for example, a tray 11 for loading and overlapping the plurality of stock materials Pu, an automatic feeder 12 capable of continuously feeding the stock materials Pu loaded on the tray 11 to the crushing unit 20, etc.

The crushing unit 20 cuts the supplied stock material Pu into small square pieces of several centimeters. The crushing unit 20 is provided with a crushing blade 21, constituting a device including a shredding blade having a width wider than a width of a normal shredder. With this, the supplied stock material Pu can be easily cut into small pieces. The small pieces are supplied to a defibrating unit 30 via upstream carrying passage 201.

The defibrating unit 30 is provided with a rotatable rotary blade, and is configured to defibrate the small pieces supplied from the crushing unit 20 into a fibrous (cotton-like) form. By the way, the defibrating unit 30 of this embodiment performs a dry-type defibrating operation to be performed not in water but in air. In the defibrating unit 30, a dry-type defibrating apparatus equipped with, for example, a disk refiner, a Turbo-Mill (made by Turbo Kogyo Co., Ltd.), a Ceren-Miller (made by Masuko Sangyo Co., Ltd.), and/or a wind generation mechanism can be arbitrarily applied. The size of small piece to be introduced to the dry-type defibrating unit 30 can be a size similar to a size of a piece discharged from a normal shredder. By the defibrating process of the defibrating unit 30, coating materials, etc., to a stock material such as e.g., printed ink, tonner, blot inhibitor, will be also released from the state of adhering to fibers (hereinafter referred to as "ink particles"). Therefore, the defibrated material produced from the defibrating unit 30 are fibers and ink particles obtained by defibrating the small particles.

The classifying unit 40 separates the carried defibrated material into the ink particles and fibers and the ink particles are removed. A cyclone 40 is applied as the classifying unit 40 of the present embodiment. The cyclone 40 is preferably a tangent input system cyclone which is relatively simple in structure. As the classifying unit 40, an airflow-type classifier of another type can be used in place of the cyclone 40. In this case, as an airflow-type classifier other than the cyclone 40, for example, an Elbow-Jet, an EID classifier, etc., can be used. An airflow-type classifier generates swirling airflow to perform separation and classification by the difference of the received centrifugal force due to the size and density of the defibrated material, and can adjust the classification point by adjusting the airflow velocity and/or the centrifugal force.

The cyclone 40 of the present embodiment is configured by an installation port 41 in which the defibrated material is introduced from the defibrating unit 30, a cylindrical portion 43 in which the installation port 41 is provided in the tangential direction, a conical portion 42 which is connected to the cylindrical portion 43, a lower outlet 46, which is provided in the lower portion of the conical portion 42, and an upper exhaust port 44 for discharging fine powders which is provided in the upper middle of the cylindrical portion 43.

In the classification processing, the airflow carrying defibrated material introduced from the installation port 41 of the cyclone 40 changes to a circular movement in the cylindrical portion 43 and moves to the conical portion 42. Depending on the difference of the centrifugal force received by the size and the density of the defibrated material, separation and classification are performed. When classified the substances contained in the defibrated material into two types, fibers and ink particles other than the fibers, fibers are larger in size or higher in density than ink particles. For this reason, the defibrated material is separated into ink particles smaller in size and lower in density than fibers and fibers larger in size and higher in density than ink particles by the classification processing. The separated ink particles are discharged to the upper exhaust port 44 as fine powder together with air. From the upper exhaust port 44 of the cyclone 40, ink particles relatively lower in density are discharged. The discharged ink particles are collected to the receiving unit 45 through the piping 203 from the upper exhaust port 44 of the cyclone 40. On the other hand, the fibers larger than ink particles and higher in density are carried toward the forming unit 70 from the lower outlet of the cyclone 40 as the defibrated fibers.

In the middle of the piping 204 in which the defibrated fibers are transferred from the cyclone 40 to the forming unit 70, the additive agent feeding unit 60, which feeds an additive agent to the defibrated fibers, is provided. As an additive agent, for example, a fusion-bondable resin, a flame retardant, a whiteness enhancer, a paper strengthening agent, a sizing agent, etc. may be used. A portion or whole of these additive agents may be omitted, or in addition to that, other additive agents may be fed. The additive agent is stored in the storing portion 61, and it is fed from the feeding port 62 by a feeding mechanism which is not shown.

Further, in the piping 204, in which the material fibers are transferred, arranged between the cyclone 40 and the forming unit 70, an information acquiring unit, which acquires the inflow information related to a flow rate of the material fibers (materials) flowing into the forming drum 71 of the forming unit 70 from the cyclone 40, is provided. In the present embodiment, as the information acquiring unit, a flow rate measuring unit 110, which acquires a flow rate of air flowing into the forming drum 71 by measuring the flow rate of air flowing inside of the piping 204 as the inflow information, is provided.

For the flow rate measuring unit 110, a flow rate sensor such as, for example, a Venturi measurement equipment, an Orifice measurement equipment, a Pitot-tube, a triangular weir, an ultrasonic flow rate measurement equipment, etc. may be applied. It is configured that a measured airflow rate is sent to the controller 130.

A sheet (web W) is formed by using a material in which the additive agent is mixed with the defibrated fiber. The material in which a fusion-bondable resin or an additive agent is mixed to the defibrated fiber is called as a material fiber.

The forming unit 70 is to deposit the material fibers in a uniform thickness, and the forming unit 70 has a mechanism that uniformly disperses the material fibers in the air, and a mechanism that suctions the material fibers on the mesh belt 73. Further, in the forming unit 70, a screen having a plurality of openings is provided, and a forming drum 71 as a screen portion in which the material fibers passing through the openings are deposited on the mesh belt 73 is provided.

As the mechanism that uniformly disperses the material fibers in the air, a forming drum 71 that feeds the material fibers to the inside portion is arranged in the forming unit 70. The forming drum 71 uniformly mixes the additive agent with the fibers by its rotation. The openings are provided in the surface of the forming drum 71. The forming drum 71 is rotatably driven, and by passing the material fibers through the openings, the material fibers can be uniformly dispersed in the air.

On the other hand, in a direction vertically downward from the forming drum 71, an endless mesh belt 73 forming a mesh is provided. The mesh belt 73 is stretched by a plurality of stretching rollers 72, and at least one of the stretching rollers 72 is rotated so as to move it in one direction.

Further, in a direction vertically downward from the forming drum 71, through the mesh belt 73, a suction apparatus 75 that generates airflow in a direction vertically downward is provided. By the suction apparatus 75, the material fibers dispersed in the air can be suctioned on the mesh belt 73.

When the material fibers are introduced in the forming drum 71 of the forming unit 70, the material fibers go through the openings of the surface of the forming drum 71 and are deposited on the mesh belt 73 by the suction power of the suction apparatus 75. At this time, the material fibers can be deposited in a uniform thickness by moving the mesh belt 73 in one direction. The deposit including such deposited material fibers is called as web W. The mesh belt may be made by a metallic, a resin, or a nonwoven fabric and it may be anything so that the material fibers can be deposited and the airflow can be getting through. By the way, when the hole diameter of the mesh is too large, the surface of the sheet becomes unevenness. When the hold diameter of the mesh is too small, it may be difficult to produce stable airflow by the suction apparatus 75. Therefore, it is preferable to appropriately adjust a hole diameter of the mesh.

The suction apparatus 75 forms a sealed box in which a desired size window is opened below the mesh belt 73, and a stable airflow can be produced by suctioning air in the box from other than the window and reducing pressure in the box.

The web W is transferred in a web transfer direction, which is shown by an arrow in FIG. 2, by moving the mesh belt 73. The moisture spraying unit 120 sprays and adds water toward the transferred web W. Because of this, hydrogen bonding between fibers can be enhanced. The web W in which water was sprayed and added is transferred to the pressurizing unit 80.

The pressurizing unit 80 is to pressurize the transferred web W. The pressurizing unit 80 is provided with two pairs of pressure rollers 81. By making the web W to which moisture was sprayed pass through between the opposed pressure rollers 81, the web W is compressed. The compressed web W is transferred to the pressurizing and heating unit 90.

The pressurizing and heating unit 90 simultaneously performs pressurizing and heating of the transferred web W. The pressurizing and heating unit 90 is provided with two pairs of heating rollers 91. By making the compressed web W pass through between the opposed heating rollers 91, the web is heated and pressurized.

In a state in which the distance between fibers is shortened and the number of contacts between fibers is increased by the pressure rollers 81, the fusion-bondable resin is molten by the heating rollers 91 to connect fibers with each other. This enhances the strength as a sheet and dehydrates to remove excessive moisture, enabling a production of an excellent sheet. The heating is preferably performed by arranging heaters in the heating rollers 91 to simultaneously perform pressurizing and heating of the web W. Below the pressure rollers 81 and the heating rollers 91, guides 108 for guiding the web W are arranged.

The web W obtained as mentioned above is transferred to the cutting unit 100. The cutting unit 100 is provided with a cutter 101 for cutting the web in the transfer direction and a cutter 102 for cutting the web in a direction perpendicular to the transfer direction, so that the web W formed in an elongated manner is cut into a desired size. The cut web W is stacked on the stacker 160 as a sheet Pr.

Figure 3:
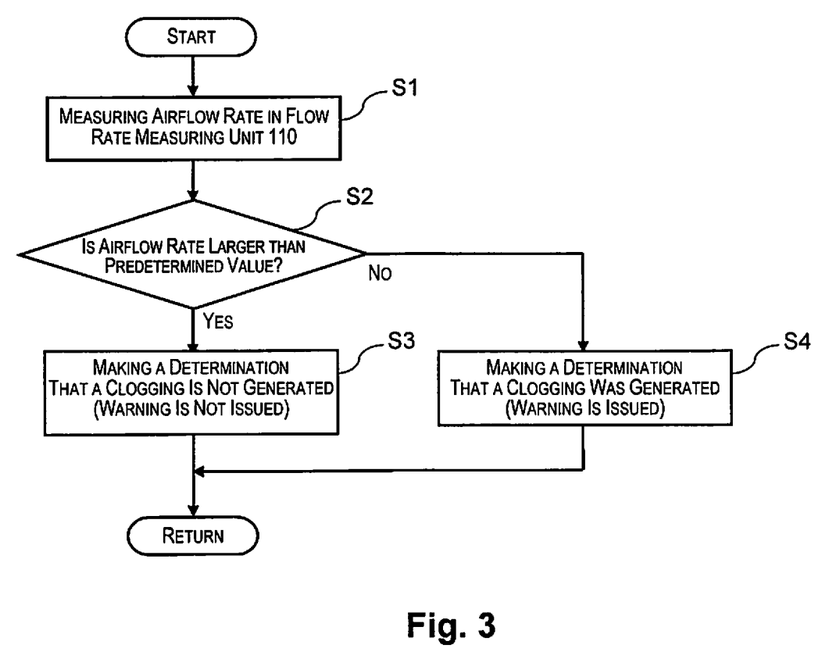
FIG. 3 is a flowchart showing a control method of the sheet manufacturing apparatus according to the first embodiment.

Next, the control method of the sheet manufacturing apparatus will be explained. FIG. 3 is a flowchart showing a control method of the sheet manufacturing apparatus according to the first embodiment. Concretely, the control method for detecting a clogging of the forming drum 71 in response with the airflow rate acquired by the flow rate measuring unit 110 will be explained.

Initially, an airflow rate flowing from the cyclone 40 to the forming unit 70 side in the piping 204 is measured by the flow rate measuring unit 110 (step S1). The measured airflow rate data is acquired to the controller 130.

Next, in the controller 130, whether or not the value of the acquired airflow rate data is larger than a predetermined value is determined (step S2). When the value of the acquired airflow rate data is larger than the predetermined value (step S2: YES), the controller 130 determines that a clogging is not generated in the openings of the forming drum 71 (step S3).

On the other hand, when the value of the acquired airflow rate data is not larger than the predetermined value (step S2: NO), the controller 130 determines that a clogging is generated in the openings of the forming drum 71 (step S4).

When the determination (detection) that the clogging was generated in the openings of the forming drum 71 was made, for example, a warning output means is used so as to issue warning and the clogging generation of the forming drum 71 is notified to an operator. When the determination (detection) that the clogging was generated in the openings of the forming drum 71 was made, with the warning output means or instead of it, a display means may be used to display so that the clogging generation of the forming drum 71 is notified to the operator. When the determination that the clogging was not generated was made, the warning is not issued.

For transferring the material fibers to the forming drum 71, the airflow from a blower, which is not shown, or the cyclone 40 is used. This airflow introduces to the forming drum 71 and passes through the openings. Here, when a clogging is generated in the openings of the forming drum 71, the resistance of the airflow is higher than the resistance when a clogging is not generated so that the airflow rate flowing into the forming drum 71 becomes smaller. When the airflow rate flowing to the forming drum 71 is smaller than the predetermined value, the determination that the clogging was generated can be made.

According to the aforementioned embodiments, the following effects can be obtained.

In the flow rate measuring unit 110, the airflow rate flowing from the cyclone 40 to the forming unit 70 side is measured, and based on the measured airflow rate, whether or not a clogging of the forming drum 71 was generated can be determined.

Second Embodiment

Figure 4:
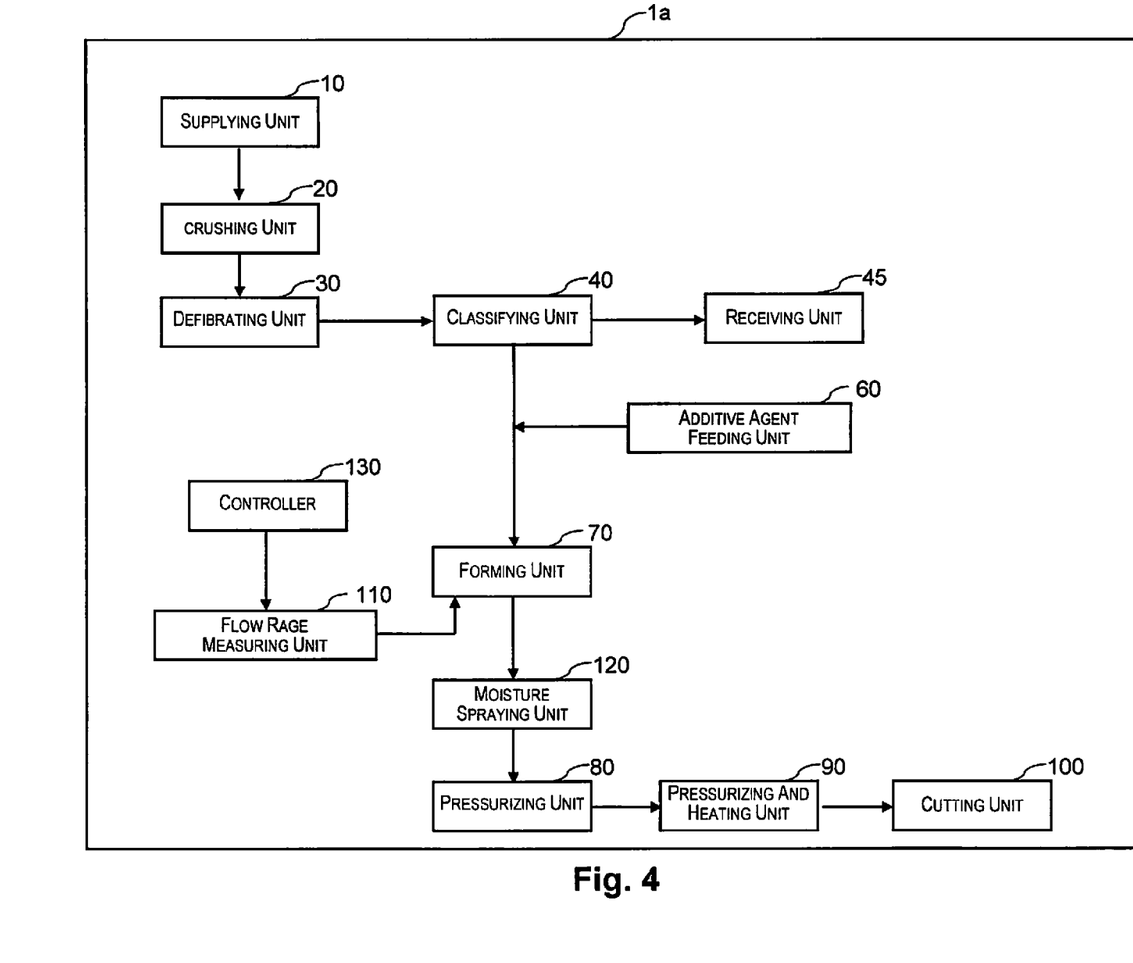
FIG. 4 is a schematic view showing a structure of a sheet manufacturing apparatus according to a second embodiment.
Figure 5:
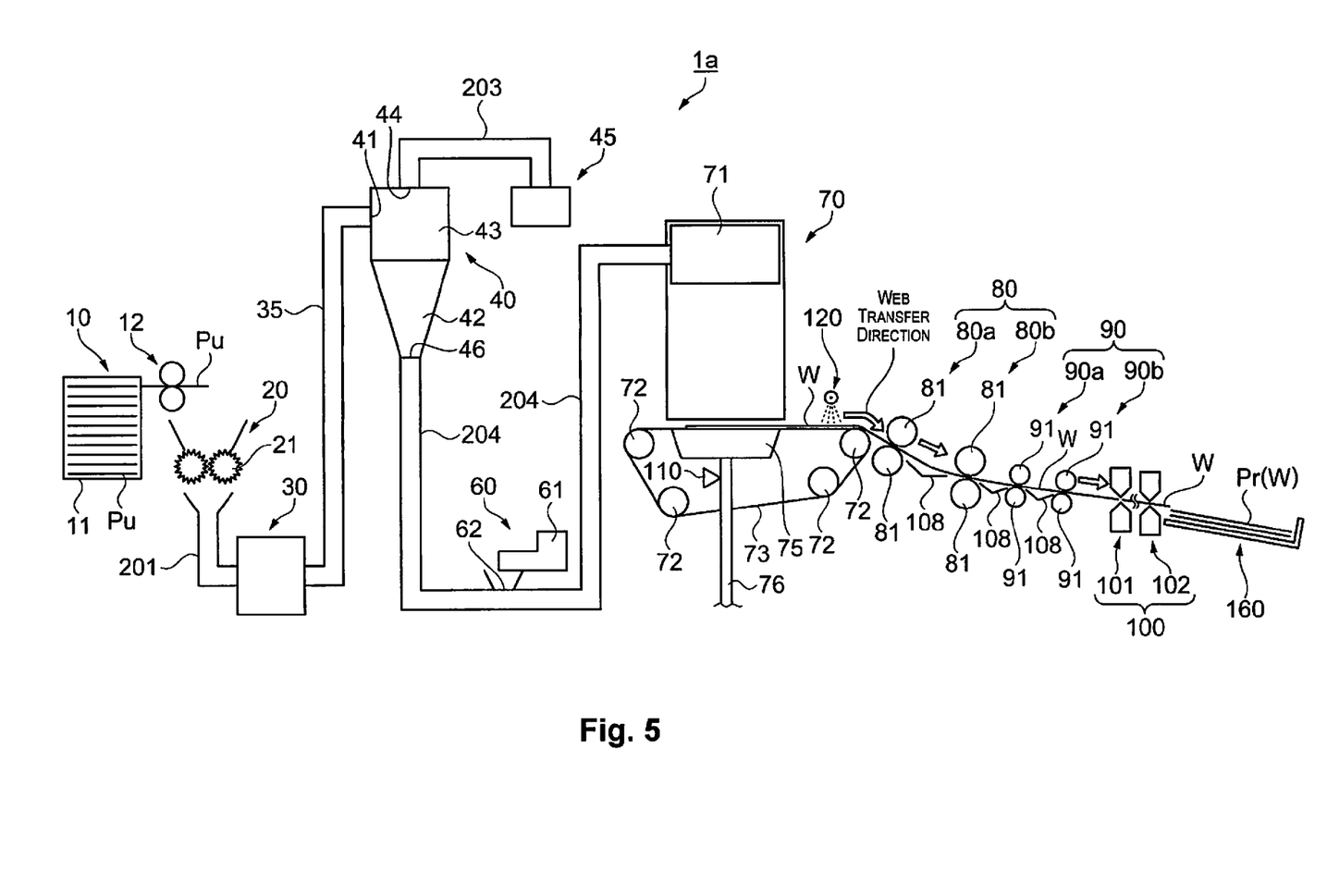
FIG. 5 is another schematic view showing the structure of the sheet manufacturing apparatus according to the second embodiment.

Next, the second embodiment will be explained. FIGS. 4 and 5 are a schematic view showing a structure of the sheet manufacturing apparatus according to the present embodiment. According to FIGS. 4 and 5, the sheet manufacturing apparatus 1a is provided with a supplying unit 10, a crushing unit 20, a defibrating unit 30, a classifying unit 40, a receiving unit 45, an additive agent feeding unit 60, a forming unit 70, a moisture spraying unit 120, a pressurizing unit 80, a pressurizing and heating unit 90, and a cutting unit 100. Further, a flow rate measuring unit 110 as an information acquiring unit that acquires the outflow information is provided. And, in the sheet manufacturing apparatus 1a, a controller 130 that controls these units is provided.

The flow rate measuring unit 110 of the present embodiment is provided inside of the air release pipe 76 that releases air, which was suctioned by the suction apparatus 75 of the forming unit 70, to outside of the sheet manufacturing apparatus 1a. And, the flow rate measuring unit 110 measures the airflow rate released from the forming unit 70 as the outflow information. By the way, other structures are the same structure as the first embodiment and therefore, the explanation is omitted.

Figure 6:
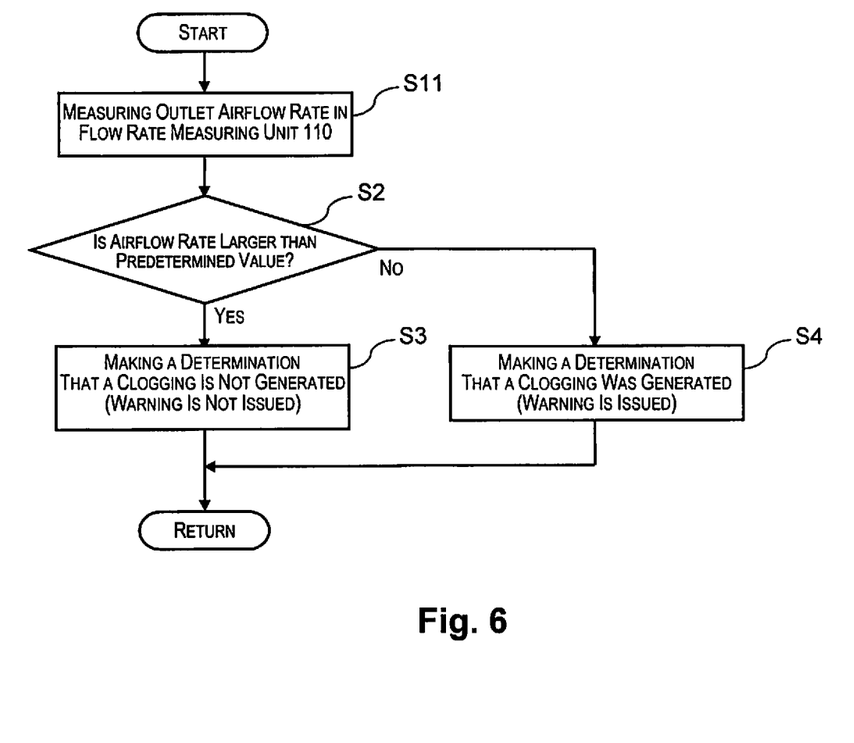
FIG. 6 is a flowchart showing a control method of the sheet manufacturing apparatus according to the third embodiment.

Next, a control method of the sheet manufacturing apparatus will be explained. FIG. 6 is a flowchart showing the control method of the second embodiment. Concretely, the control method that detects a clogging of the forming drum 71 depending on the airflow rate acquired by the flow rate measuring unit 110 will be explained.

Initially, the airflow rate released from the suction apparatus 75 of the forming unit 70 is measured by the flow rate measuring unit 110 (step S11). The measured airflow rate data is acquired in the controller 130.

Next, in the controller 130, whether or not the value of the acquired airflow rate data is larger than the predetermined value is determined (step S2). When the value of the acquired airflow rate data is larger than the predetermined value (step S2: YES), the controller 130 determines that a clogging is not generated in the openings of the forming drum 71 (step S3).

On the other hand, when the value of the data is not larger than the predetermined value (step S2: NO), the controller 130 determines that the clogging was generated in the openings of the forming drum 71 (step S4).

And, when the determination (detection) that the clogging was generated in the openings of the forming drum 71 was made, for example, the warning is issued by using a warning output means so that the clogging generation of the forming drum 71 is notified to the operator. By the way, when the determination (detection) that the clogging was generated in the openings of the forming drum 71 was made, with the warning output means or instead of it, a display means may be used so that the clogging generation of the forming drum 71 is notified to the operator. When the determination that the clogging was not generated was made, the warning is not issued.

When the suction is performed by the suction apparatus 75, the suction power is also functioned to the forming drum 71. Here, when the clogging was generated in the openings of the forming drum 71, the resistance of the airflow is higher than the resistance when the clogging was not generated so that the airflow suctioned from the forming drum 71 becomes small. Therefore, when the airflow suctioned by the suction apparatus 75 is smaller than the predetermined value, it can determine that the clogging was generated.

According to the aforementioned embodiments, the following effects can be obtained.

The airflow rate released from the suction apparatus 75 of the forming unit 70 is measured by the flow rate measuring unit 110, and based on the measured airflow rate, it can determine whether or not the clogging of the forming drum 71 was generated.

Third Embodiment

Figure 7:
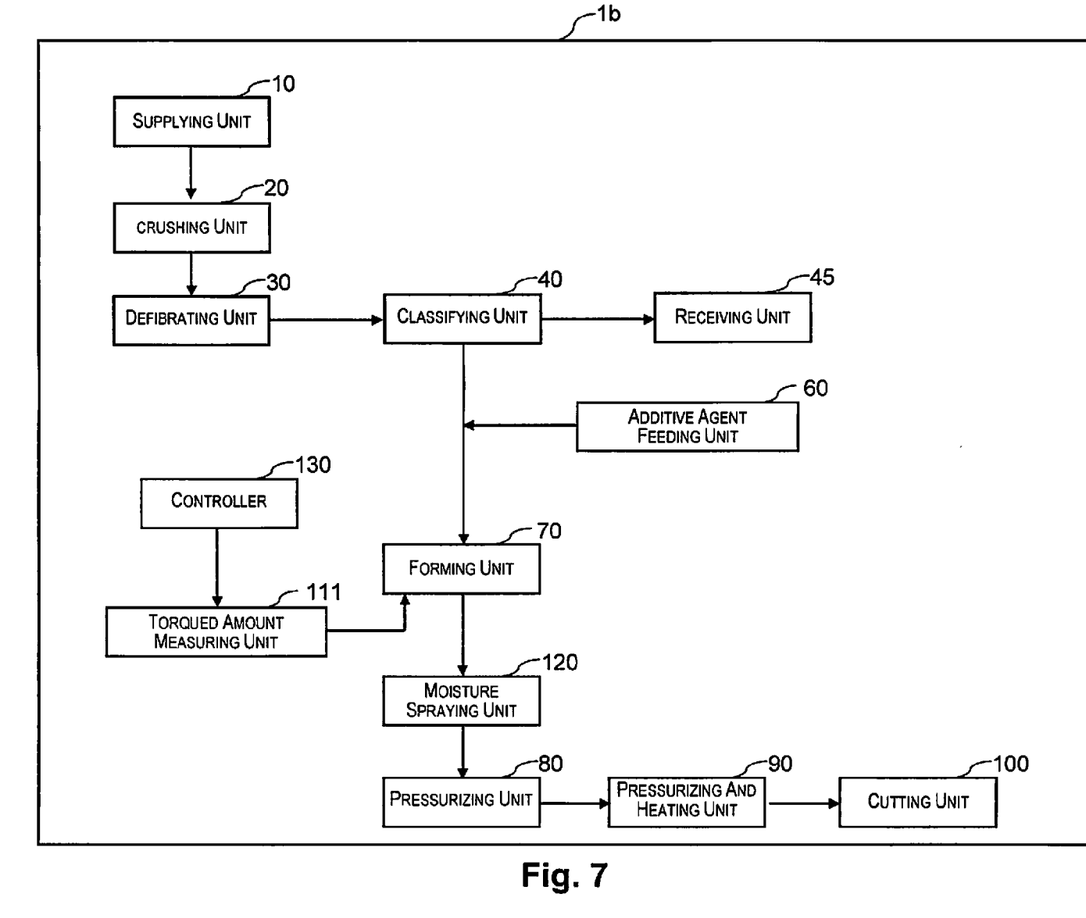
FIG. 7 is a schematic view showing a structure of a sheet manufacturing apparatus according to a third embodiment.
Figure 8:
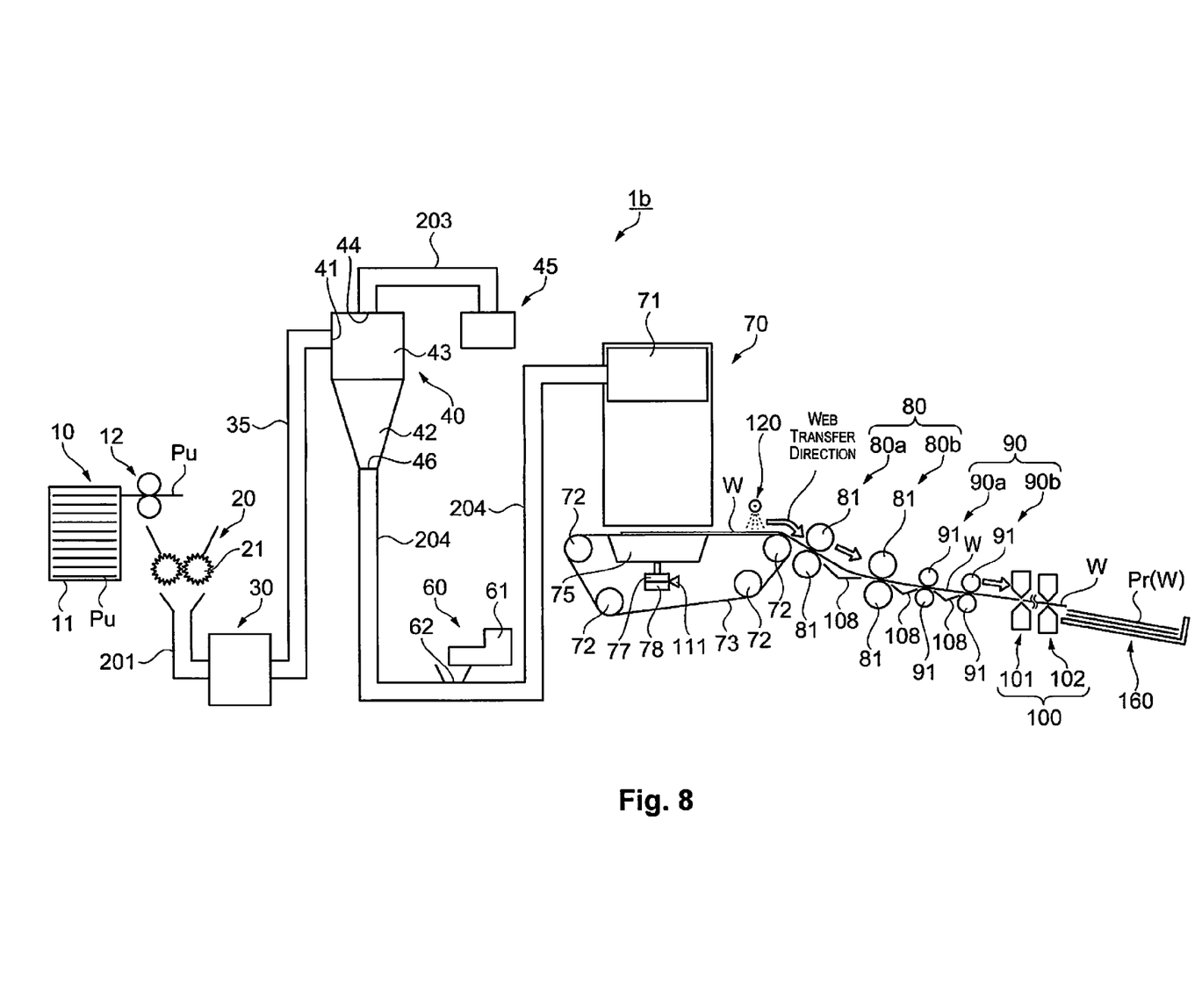
FIG. 8 is another schematic view showing the structure of the sheet manufacturing apparatus according to the third embodiment.

Next, the third embodiment will be explained. FIGS. 7 and 8 are a schematic view showing a structure of the sheet manufacturing apparatus according to the present embodiment. According to FIGS. 7 and 8, the sheet manufacturing apparatus 1b is provided with a supplying unit 10, a crushing unit 20, a defibrating unit 30, a classifying unit 40, a receiving unit 45, an additive agent feeding unit 60, a forming unit 70, a moisture spraying unit 120, a pressurizing unit 80, a pressurizing and heating unit 90, and a cutting unit 100. Further, a torque amount measuring unit 111 as an information acquiring unit that acquires the outflow information is provided. And, in the sheet manufacturing apparatus 1b, a controller 130 that controls these units is provided.

The torque amount measuring unit 111 of the present embodiment measures current value, which drives the suction apparatus 75 of the forming unit 70, or torque value applied to the suction apparatus 75 as outflow information. The suction apparatus 75 of the present embodiment is provided with a suction fan 77, which suctions air, and a suction fan drive portion 78, which drives the suction fan 77. Accordingly, a load applied to the suction fan drive portion 78 depending on the suction air condition.

That is, when a clogging was generated in the forming drum 71, the flow rate of air, which transfers the materials, becomes small so that the load applied to the suction fan drive portion 78 increases. Therefore, in the suction fan drive portion 78, more current is necessary and the torque value applied to the suction fan 77 increases. Because of this, it is possible to determine whether or not the clogging of the forming drum 71 was generated based on the measurement data of the torque amount measuring unit 111.

By the way, other structures of the sheet manufacturing apparatus 1b are the same structure as the first embodiment and therefore, the explanation is omitted.

Figure 9:
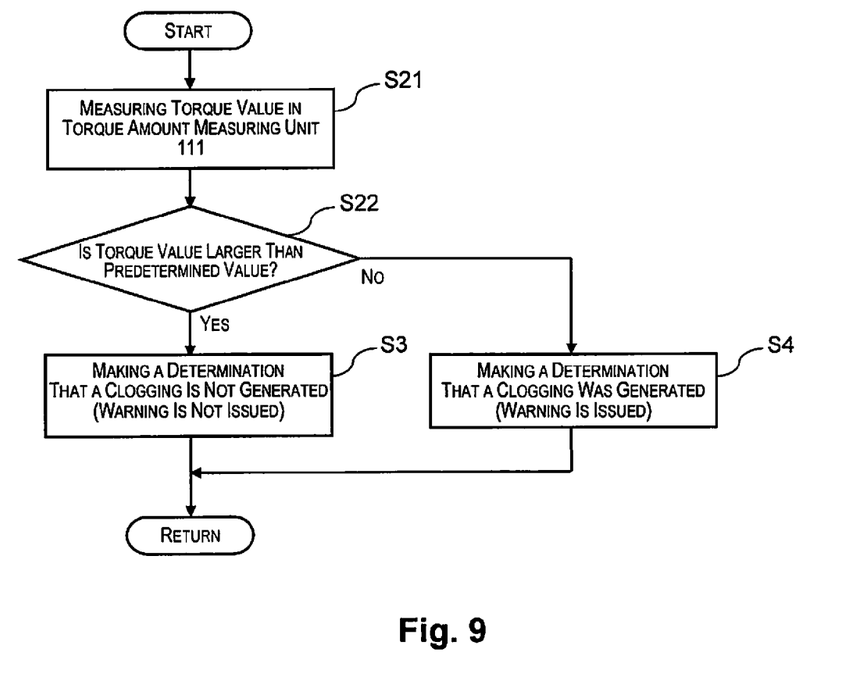
FIG. 9 is a flowchart showing a control method of the sheet manufacturing apparatus according to the third embodiment.

Next, the control method of the sheet manufacturing apparatus will be explained. FIG. 9 is a flowchart showing the control method of the third embodiment. Concretely, the control method that detects a clogging of the forming drum 71 depending on the airflow rate acquired by the torque amount measuring unit 111 will be explained.

Initially, a torque value applied to the suction apparatus of the forming unit 70 is measured by the torque amount measuring unit 111 (step S21). The measured torque value is acquired to the controller 130.

Next, in the controller 130, the determination whether or not the acquired torque value is larger than the predetermined value is made (step S22). When the acquired torque value is larger than the predetermined value (step S22: YES), the controller 130 determines that a clogging was generated in the openings of the forming drum 71 (step S4).

On the other hand, when the acquired torque value is not larger than the predetermined value (step S22: NO), the controller 130 determines that the clogging was not generated in the openings of the forming drum 71 (step S3).

And, when the determination (detection) that the clogging was generated in the openings of the forming drum 71 was made, for example, the warning is issued by using a warning output means so that the clogging generation of the forming drum 71 is notified to the operator. By the way, when the determination (detection) that the clogging was generated in the openings of the forming drum 71 was made, with the warning output means or instead of it, a display means may be used so that the clogging generation of the forming drum 71 is notified to the operator. When the determination that the clogging was not generated was made, the warning is not issued.

According to the aforementioned embodiments, the following effects can be obtained.

The torque value applied to the suction apparatus 75 of the forming unit 70 is measured by the torque amount measuring unit 111, and based on the measured torque value, the determination whether or not the clogging of the forming drum 71 was generated can be made.

Fourth Embodiment

Figure 10:
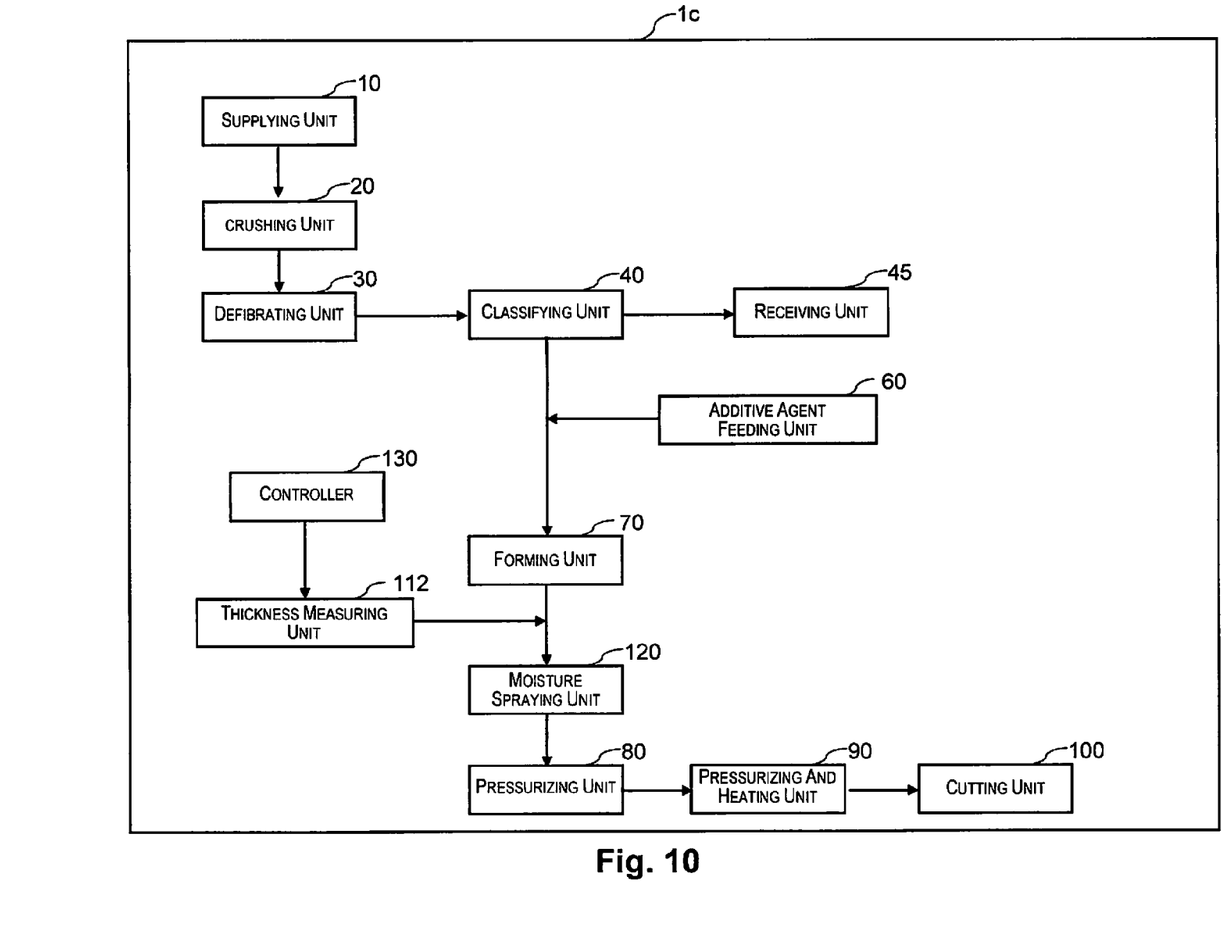
FIG. 10 is a schematic view showing a structure of a sheet manufacturing apparatus according to a fourth embodiment.
Figure 11:
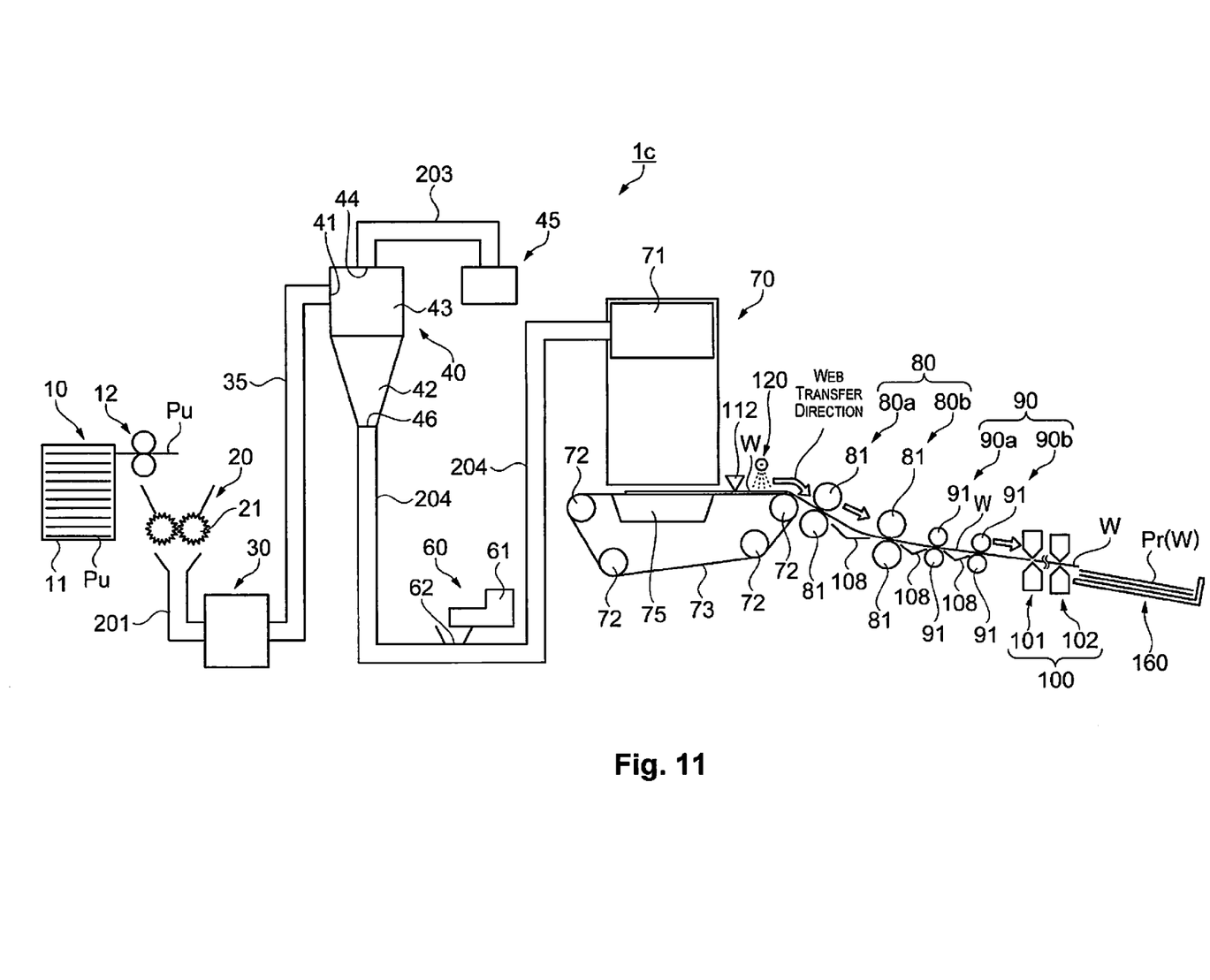
FIG. 11 is another schematic view showing the structure of the sheet manufacturing apparatus according to the fourth embodiment.

Next, the fourth embodiment will be explained. FIGS. 10 and 11 are a schematic view showing a structure of the sheet manufacturing apparatus according to the present embodiment. According to FIGS. 10 and 11, the sheet manufacturing apparatus 1c is provided with a supplying unit 10, a crushing unit 20, a defibrating unit 30, a classifying unit 40, a receiving unit 45, an additive agent feeding unit 60, a forming unit 70, a moisture spraying unit 120, a pressurizing unit 80, a pressurizing and heating unit 90, and a cutting unit 100. Further, a thickness measuring unit 112 as an information acquiring unit that acquires the outflow information is provided. And, in the sheet manufacturing apparatus 1c, a controller 130 that controls these units is provided.

In the present embodiment, the thickness measuring unit 112 that measures a deposition thickness of material fibers as the materials deposited on the mesh belt in the forming unit 70 is provided. Various sensors such as an optical sensor, an ultrasonic sensor, a mechanical sensor, etc. can be applied as the thickness measuring unit 112. For example, when the clogging was generated in the forming drum 71, the airflow rate, which transfers material fibers, is reduced so that it can be concerned that the deposition thickness deposited in the forming unit 70 is reduced. Therefore, it is possible to determine existence or non-existence of the clogging in the forming drum 71 based on the measurement data of the thickness measuring unit 112.

By the way, other structures of the sheet manufacturing apparatus 1c are the same structure as the first embodiment and therefore, the explanation is omitted.

Figure 12:
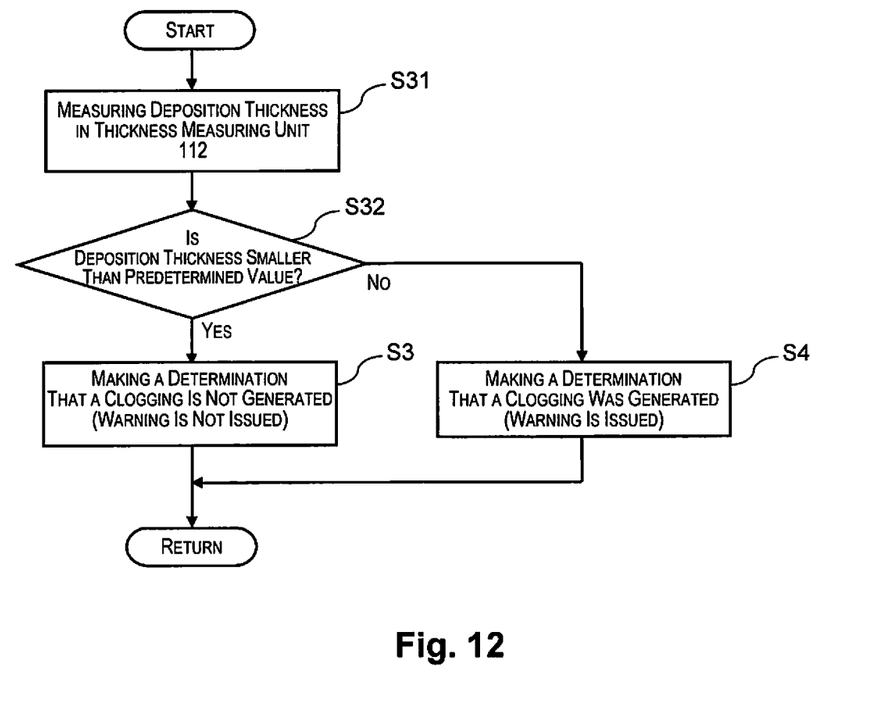
FIG. 12 is a flowchart showing a control method of the sheet manufacturing apparatus according to the fourth embodiment.

Next, the control method of the sheet manufacturing apparatus will be explained. FIG. 12 is a flowchart showing the control method of the fourth embodiment. Concretely, the control method that detects a clogging of the forming drum 71 depending on the deposition thickness data acquired by the thickness measuring unit 112 will be explained.

Initially, the deposition thickness of the material fibers in the forming unit 70 is measured by the thickness measuring unit 112 (step S31). The measured thickness data is acquired to the controller 130.

Next, in the control method, the determination whether or not the value of the acquired value of the deposition thickness is smaller than a predetermined value is made (step S32). When the acquired value of the deposition thickness is smaller than the predetermined value (step S32: YES), the controller 130 determines that a clogging was generated in the openings in the forming drum 71 (step S4).

On the other hand, when the acquired value of the deposition thickness is not smaller than the predetermined value (step S32: NO), the controller 130 determines that the clogging was not generated in the forming drum 71 (step S3).

And, when the determination (detection) that the clogging was generated in the openings of the forming drum 71 was made, for example, the warning is issued by using a warning output means so that the clogging generation of the forming drum 71 is notified to the operator. By the way, when the determination (detection) that the clogging was generated in the openings in the forming drum 71 was made, with the warning output means or instead of it, a display means may be used so that the clogging generation of the forming drum 71 is notified to the operator. When the determination that the clogging was not generated was made, the warning is not issued.

According to the aforementioned embodiments, the following effects can be obtained.

The deposition thickness of the material fibers in the forming unit 70 is measured by the thickness measuring unit 112, and based on the measured deposition thickness data, it can determine whether or not the clogging of the forming drum 71 was generated.

The present invention is not limited to the aforementioned embodiments, and various modifications and/or alternations can be added to the aforementioned embodiments. Modified examples will be explained below.

In the first embodiment, the airflow rate was measured as the inflow information by using the flow rate measuring unit 110, but it is not limited to this structure. For example, the flow rate of material fibers as the material that flows into the forming drum 71 may be applied as the inflow information. Therefore, the aforementioned same effects can be obtained.

In the second embodiment, the airflow rate was measured as the outflow information by using the flow rate measuring unit 110, but it is not limited to this structure. For example, the flow rate of material fibers as a material that flow out from the forming drum 71 may be applied as the outflow information. Therefore, the aforementioned same effects can be obtained.

In the fourth embodiment, the deposition thickness of the material fibers was measured as the outflow information by using the thickness measuring unit 112, but it is not limited to this structure. For example, the weight of the deposited material fibers may be applied as the outflow information. Therefore, the aforementioned same effects can be obtained.

As the sheet in the present embodiments, it is mainly said that a sheet is made from plant fibers such as cellulose, etc. as a stock material. However, it is not limited to this, and it may be a board shape, a web shape, or a shape having irregularities. Further, as the stock material, it may be plastic fibers such as polyethylene terephthalate (PET), etc., or animal fibers such as wool, etc. That is, it includes fibers as a stock material in which the whiteness needs to be improved. Concretely, it includes a sheet that a pure pulp as a stock material is formed into a sheet shape, a recycled sheet that a used paper as a stock material is formed into a sheet shape, a nonwoven fabric, a fiber board, a tissue paper, kitchen paper, cleaner, filter, liquid absorbing material, sound absorber, cushioning material, mat, etc.

Even if one or two openings among the plurality of openings in the forming drum 71 were clogged, it does not affect to the flow rate or the deposition thickness. Therefore, the meaning of the case that the clogging of the screen portion was generated can be said in the case that the clogging approximately affects to the flow rate or the deposition thickness. It is in the case that for example, 20% to 50% of openings among the plurality of openings were clogged. By the way, the timing for the determination of a clogging is at the time of start production, or it is periodically determined at the time of sheet production. Also, the generation of the clogging was determined at once and the warning may be issued, but variability of the flow rate or the deposition thickness is large so that the warning may be issued when the determination that numbers of clogging were generated was made.

When the determination that the clogging was generated was made, the control for removing the clogging may be performed. For example, the air (compressed air) that the flow rate is larger than the flow rate of air transferring the material fibers before the clogging was generated is sent to inside of the forming drum 71. Therefore, the fibers dogged in the openings are forcibly pushed out so that the clogging is removed. That is, the effect is exhibited by sending the compressed air.

Further, when the determination that the clogging was generated was made, the flow rate of air or materials that flows into the forming drum 71 may be increased. That is, it can be achieved when the suction power of the suction apparatus 75 is increased. For example, when the blower is provided between the additive agent feeding unit 60 and the forming unit 70, by increasing the flow rate of the blower that transfers the material fibers to the forming drum 71, the flow rate of the materials or air can be increased. Therefore, it can be suppressed that the openings of the forming drum 71 are clogged and the flow rate of the material or air is reduced.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A sheet manufacturing apparatus comprising:
   a screen portion having a plurality of openings, a material being introduced and passed through the openings; and
   an information acquiring unit configured to acquire at least one of inflow information related to a flow rate of the material that flows into the screen portion and outflow information related to a flow rate of the material that passes through the screen portion;
   a controller configured to make a determination that a clogging of the screen portion is generated, when the flow rate is reduced, based on at least one of the inflow information and the outflow information acquired by the information acquiring unit.

2. The sheet manufacturing apparatus according to claim 1, wherein
the inflow information is a flow rate of air that flows into the screen portion.

3. The sheet manufacturing apparatus according to claim 1, wherein
the inflow information is a flow rate of the material that flows into the screen portion.

4. The sheet manufacturing apparatus according to claim 1, wherein
the outflow information is a flow rate of air that flows out from the screen portion.

5. The sheet manufacturing apparatus according to claim 1, wherein
the outflow information is a thickness of the material that is deposited after passing through the screen portion.

6. The sheet manufacturing apparatus according to claim 1, wherein
the outflow information is a weight of the material that is deposited after passing through the screen portion.

7. The sheet manufacturing apparatus according to claim 1, wherein
the outflow information is a flow rate of the material that flows out from the screen portion.

8. The sheet manufacturing apparatus according to claim 1, further comprising:
a suction portion configured to suction the screen portion, wherein
the outflow information is information related to a load that drives the suction portion.

9. The sheet manufacturing apparatus according to claim 1, wherein
the controller increases the flow rate of the material that flows into the screen portion when the determination that the clogging of the screen portion is generated is made.

10. The sheet manufacturing apparatus according to claim 1, wherein
the controller increases the flow rate of the material that flows into the screen portion, more than the flow rate of the material that flows into the screen portion before the clogging is generated, when the determination that the clogging of the screen portion is generated is made.

* * * * *